Patented May 14, 1929.

1,713,394

UNITED STATES PATENT OFFICE.

MARCELLO PIRANI, OF BERLIN-WILMERSDORF, GERMANY, ASSIGNOR TO PATENT-TREUHAND-GESELLSCHAFT FUER ELEKTRISCHE GLUEHLAMPEN, OF BERLIN, GERMANY, A CORPORATION OF GERMANY.

PROCESS FOR THE MANUFACTURE OF TRANSLUCENT HOLLOW-GLASS ARTICLES, PARTICULARLY OF MILK-GLASS BULBS FOR ELECTRIC INCANDESCENT LAMPS.

No Drawing. Application filed March 8, 1928, Serial No. 260,244, and in Germany March 24, 1927.

My invention relates to a process for the manufacture of translucent hollow glass articles, particularly of milk glass bulbs for electric incandescent lamps.

The manufacture of translucent hollow glass articles, particularly of milk glass bulbs for electric incandescent lamps, is not always without difficulties. In accordance with the invention the manufacture is made easier by proceeding as follows:

Ordinary solid clear glass, (either dry or after the addition of liquids which are easily removed by volatilization), is pulverized and preferably ground in a ball mill for a period of 20 to 30 hours. As known, the fineness of the pulverized glass is not uniform. The coarsest grains will pass through a sieve of 3000–7000 meshes sq. cm.; the finest grains have a diameter of about .0005 mm. If a volatile liquid, for example alcohol, is added before or during the pulverizing process, the quantity of which is so chosen, that the pulverized glass is thoroughly wet and no excessive liquid is present. The pulverized clear glass then is sintered in such a way that it becomes firmly consolidated. In order to maintain the sintering temperature as low as possible and in order to economize in the amount of glass, it is advisable to cause such a preformation before sintering that small, compressed bodies, for example of conical or bulb-like shape with a central groove, which exactly suffice for the manufacture of milk glass blubs, should be formed from the glass powder. These bodies are sintered at such a low temperature in the neighbourhood of 600° C. that they only contract to a certain extent but do not alter in shape if the operation is carried out sufficiently rapidly. The whole sintering process is finished in a few minutes; the highest sintering temperature lasting about one minute. The single glass grains unite with one another but the glass does not flow in the ordinary sense of the word. The air spaces enclosed by the glass, which in a known manner cause turbidity or translucency of the sintered glass, still are of irregular and varied shapes and, as known, in the size of about .0005–.001 mm. The formation of spherical gas bubbles, which frequently unite in a soft mass to become large spheres, is prevented by the rapid sintering process. If the ground glass is not preformed when cold, the mass of glass powder if necessary must be heated to a slightly higher temperature, for example to a temperature of 620–650° C., until it becomes so soft that the separate samples or test pieces for further working can be removed or separated directly from the batch. In this case the mass should also be kept as viscous as possible in order to prevent coalescence of the gas or air bubbles, which cause turbidity of the glass.

The viscous sintered glass gobs, either previously formed or separated from a batch, are then blown into a bulb in the usual manner by a blow-pipe operated either manually or by a machine. The glass gobs or bodies attached to the blow-pipe, are then heated to such a high temperature for example 800–850° C. that they can be blown, and then are blown. The blowing of the sintered glass gobs may be carried out simply by means of a glass tube which is fused to the sintered glass gobs with its heated end. The attached glass tube may be blown to such an extent when the bulb is being blown, that it forms the neck of the bulb and frequently can remain as such. In case this tube is of clear glass the blown milk glass bulb then will have a clear glass neck. If the process of blowing and heating to a high temperature which is required for it, is carried out sufficiently rapidly, namely in a part of a minute, that is to say in a few seconds, the air bubbles have no time to unite to form large bubbles, so that the bulbs have a beautiful, uniform turbidity, which gives them the appearance of the ordinary milk glass bulbs. In a similar manner flashed bulbs may be made of this material.

If coloured translucent bulbs are desired it is possible to start with coloured glass which is pulverized in the described manner.

In the new process of making blown articles, as incandescent electric lamp bulbs, bottles and the like, the degree of turbidity may be regulated to a considerable extent, as will be readily understood, by changing the sintering temperature, the duration of the sintering, and also the grain size, (that is the duration of the pulverizing process). In order further to increase the turbidity or translucency caused by air bubbles, a small quantity, for instance a few per cent, of some known translucency causing material used for producing milk glass, for example $Al_2O_3$, $TiO_2$ or $ZrO_2$ may be added in pulverized condition to the clear glass or coloured glass during or after the pulverizing process. In the latter case the whole pulverized material must be thoroughly mixed. The particles of the opacity causing material embedded between the particles of glass are of the same size as the particles of glass and the little air or gas bubbles which also cause translucency. Instead of these opacifying means, colouring agents may be added, if required, to the pulverized clear glass or to the sintered mass. Since the highest temperature to which the substance is heated during the process of manufacture is lower than that to which it is heated during the usual fusion process, the degree of turbidity of the glass cannot be altered by the dissolving of the added agents for producing turbidity or colouring agents. Consequently the choice of these agents is not so limited as in the case of the usual fusion process. In the same way, a change in the coefficient of expansion or in the melting point of the glass, owing to additions, does not occur as easily as, for example, that which would be caused by the above-mentioned addition of $Al_2O_3$ during the fusion process.

A considerable advantage of the new process of manufacture is that it is possible to a great extent to make glass waste, in the form of broken or blistered scrap glass, into milk glass. An additional economy in the cost of fuel may be obtained, since the glass used as a powder need not be refined to such an extent before pulverization.

The outer surface of the hollow glass article produced may be more or less smooth or rough. A more smooth surface will be obtained by starting from a very finely pulverized material and by employing a comparatively higher blowing temperature.

The capability of reflection of the sintered milk glass varies between 20-70% and the diffuse light penetration varies between 70-20%.

I claim:—

1. Method of making translucent, hollow glass articles, which comprises finely pulverized clear glass, sintering the powdered glass and during blowing quickly heating the glass to blowing temperature while maintaining the included air or gas uniformly distributed to produce the translucency of the glass.

2. Method of making translucent, hollow glass articles, which comprises finely grinding clear glass, pressing the resulting powder into molds, heating the molded form to sinter it and then quickly heating the molded form during blowing to blowing temperature while maintaining the included air or gas distributed throughout the mass.

3. Method of making translucent hollow glass bodies, which comprises finely pulverizing glass, sintering the glass, melting onto a gob of the sintered glass the end of a glass tube and blowing the article through such tube while quickly heating the gob to blowing temperature to maintain uniform distribution of the small air or gas pockets within the mass.

4. Method of making translucent hollow glass bodies, which comprises finely grinding glass, adding thereto a clouding material, sintering the mass, and blowing a gob thereof while being heated to blowing temperature, while maintaining uniform distribution of the small air or gas inclusions that produce translucency.

In testimony that I claim the foregoing as my invention, I have signed my name hereto.

MARCELLO PIRANI.